(12) United States Patent
Niimura

(10) Patent No.: US 7,245,394 B2
(45) Date of Patent: Jul. 17, 2007

(54) CONTROL PROGRAM FOR PRINTER NOZZLE RECOVERY

(75) Inventor: Hiroyuki Niimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/440,193

(22) Filed: May 19, 2003

(65) Prior Publication Data

US 2003/0214659 A1  Nov. 20, 2003

(30) Foreign Application Priority Data

May 20, 2002 (JP) ............... 2002-145058

(51) Int. Cl.
*G06F 15/00* (2006.01)
*G06F 3/12* (2006.01)
*G06K 1/00* (2006.01)

(52) U.S. Cl. ...................... 358/1.8; 358/1.15
(58) Field of Classification Search ............... 358/1.8, 358/1.12, 1.13, 1.14, 1.15, 1.18; 347/12, 347/17, 19, 20, 22, 29, 40, 47

See application file for complete search history.

(56) References Cited

U.S. PATENT DOCUMENTS

| | | | | |
|---|---|---|---|---|
| 6,089,695 A | * | 7/2000 | Takagi et al. | 347/40 |
| 6,540,318 B1 | * | 4/2003 | Ikeda | 347/19 |
| 6,659,580 B2 | * | 12/2003 | Horikoshi | 347/9 |

* cited by examiner

*Primary Examiner*—Douglas Q. Tran
(74) *Attorney, Agent, or Firm*—Fitzpatrick, Cella, Harper & Scinto

(57) ABSTRACT

The invention is directed toward improving the efficiency with which an ink-jet printing apparatus performs preliminary discharging of ink. Specifically, the host apparatus of a printer specifies, as part of image data, the timing at which the printer is to execute printhead recovery. The host computer acquires information relating to the nozzle arrangement of the printer and determines, from this nozzle arrangement information and rendered image data, the nozzle number of any nozzle that has failed to discharge ink for more than a predetermined number of scans. When image data is rendered with regard to non-discharging nozzles, preliminary-discharge image data is combined with this data and the combined data is transmitted to the printer.

13 Claims, 6 Drawing Sheets

501

| NOZZLE NO. | NUMBER OF NON-DISCHARGE SCANS |
|---|---|
| NOZZLE 1 | 3 |
| NOZZLE 2 | 1 |
| NOZZLE 3 | 5 |
| NOZZLE 4 | 0 |
| ⋮ | ⋮ |

FIG. 5

| NOZZLE NO. | NUMBER OF NON-DISCHARGE SCANS |
|---|---|
| NOZZLE 1 | 3 |
| NOZZLE 2 | 1 |
| NOZZLE 3 | 5 |
| NOZZLE 4 | 0 |
| ⋮ | ⋮ |

501

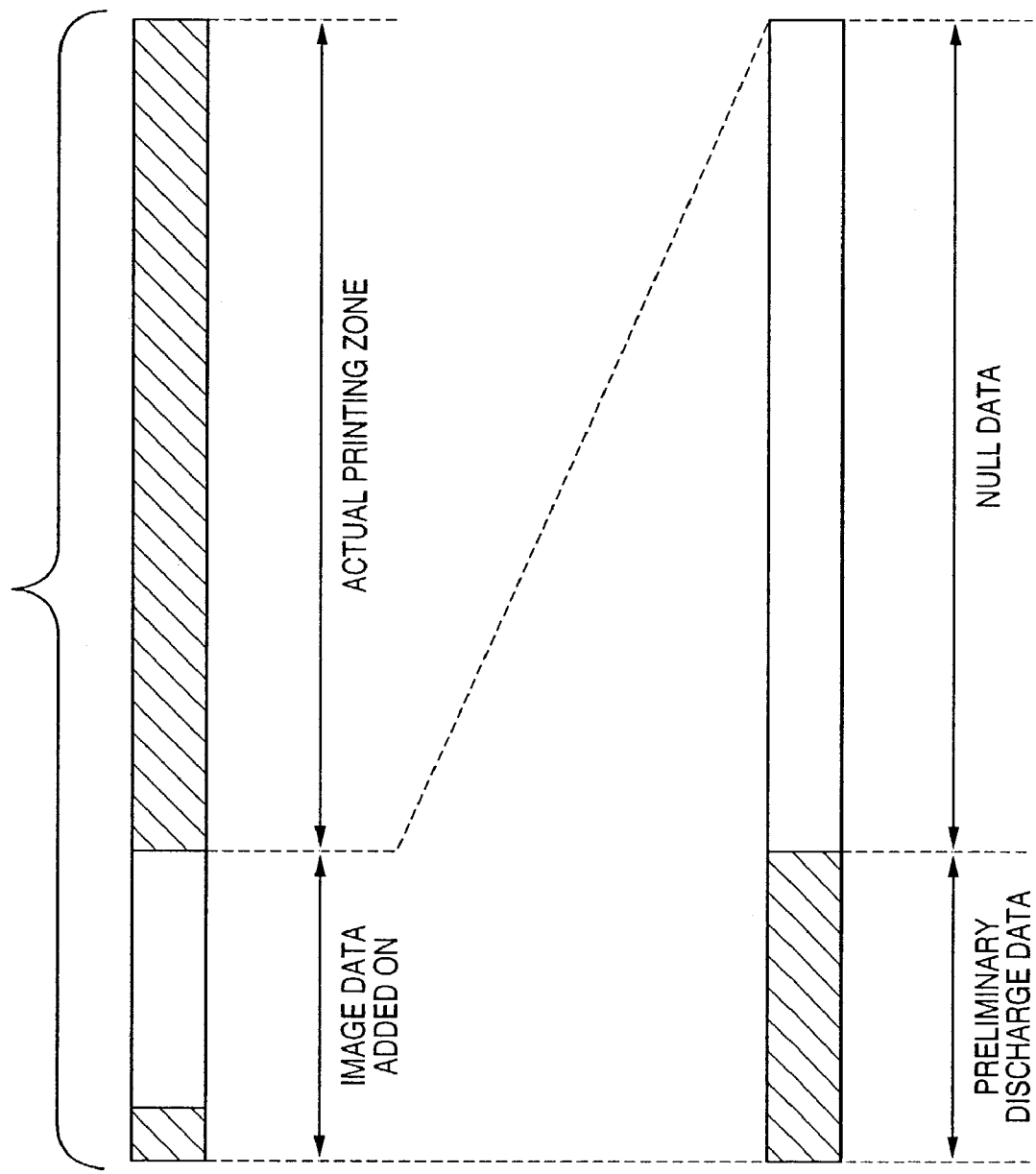

CONTROL PROGRAM FOR PRINTER NOZZLE RECOVERY

FIELD OF THE INVENTION

This invention relates to a printer control program for recovering the nozzles of a printing apparatus, a method of controlling a printing apparatus, an image processing apparatus and an image printing system.

BACKGROUND OF THE INVENTION

In a printing apparatus for printing an image by discharging a printing material from a plurality of nozzles in the prior art, a preliminary discharge operation is performed in order to effect the recovery of any nozzles that fail to discharge the printing material properly. The preliminary discharge processing usually is processing that causes a nozzle to forcibly discharge printing material at a prescribed preliminary discharge position. Specifically, failure of a nozzle to discharge is monitored in the printing apparatus and, if a nozzle that fails to discharge for a predetermined period of time is found, the nozzle is moved to the preliminary discharge position and the printing material is forcibly discharged from this nozzle.

In the prior art described above, however, the preliminary discharge processing is executed in the printing apparatus independently and processing for printing images is dealt with entirely separately of processing for preliminary discharge processing. As a consequence, it is necessary to perform preliminary discharge processing through an independent sequence both in terms of hardware and software. The processing load becomes a problem. Further, since whether preliminary discharge processing is necessary or not is determined within the printing apparatus, print processing is delayed by the amount of time needed for the determination processing.

For example, use is made of a timer that measures the time intervals of preliminary discharge within the printing apparatus, or the number of printing scans is counted. If a predetermined period of time or predetermined number of scans is exceeded and image data is received, processing for head recovery is executed. This makes it necessary to execute processing for needless movement of the carriage.

SUMMARY OF THE INVENTION

Accordingly, an object of the present invention is to execute, in an efficient manner, processing for nozzle recovery in a printing apparatus.

According to the present invention, the foregoing object is attained by providing a program for causing a computer, which is connected to and controls a printing apparatus that prints an image by discharging a printing material from a plurality of nozzles, to execute the following steps: an acquisition step of acquiring information relating to arrangement of the nozzles of the printing apparatus; a transmitting step of transmitting print image data, which corresponds to an image printed by the printing apparatus, to the printing apparatus; and a determination step of determining, based upon the information relating to arrangement of the nozzles and the print image data, whether non-discharging nozzles that have failed to discharge the printing material over a predetermined period of time exists when an image is printed by the printing apparatus; wherein in a case where existence of the non-discharging nozzle has been determined at the determination step, the transmitting step transmits preliminary-discharge image data, which is for causing the non-discharging nozzles to discharge the printing material, to the printing apparatus in combination with the print image data.

The acquisition step further acquires a preliminary discharge position on the printing apparatus, and the transmitting step transmits the preliminary-discharge image data in combination with the print image data in such a manner that the printing material will be discharged from a nozzle at the preliminary discharge position.

In a case where the preliminary discharge position of the printing apparatus is spaced away from a printing zone in which printing of an image is performed, the transmitting step inserts null data between the preliminary-discharge print data and print image data and transmits the resultant data to the printing apparatus as one line of raster data.

In a case where there are a plurality of preliminary discharge positions acquired at the acquisition step, the transmitting step combines the preliminary-discharge image data with the print image data in such a manner that the printing material will be discharged from a nozzle at a preliminary discharge position that is closest to the image to be printed.

The printing apparatus has a printhead equipped with a plurality of nozzles, and the determination step performs the determination whenever print image data equivalent to one scan of the printhead is transmitted at the transmitting step.

The determination step determines that a nozzle that has not discharged the printing material even once over a predetermined number of scans of the printhead is a non-discharging nozzle.

The acquisition step further acquires scanning speed of the printhead, and the determination step changes the predetermined number of scans in accordance with the scanning speed of the printhead.

According to the present invention, the foregoing object is attained by providing a control method for controlling a printing apparatus that prints an image by discharging a printing material from a plurality of nozzles, the method comprising: an acquisition step of acquiring information relating to arrangement of the nozzles of the printing apparatus; a transmitting step of transmitting print image data, which corresponds to an image printed by the printing apparatus, to the printing apparatus; and a determination step of determining, based upon the information relating to arrangement of the nozzles and the print image data, whether non-discharging nozzles that have failed to discharge the printing material over a predetermined period of time exist when an image is printed by the printing apparatus; wherein in a case where existence of the non-discharging nozzle has been determined at the determination step, the transmitting step transmits preliminary-discharge image data, which is for causing the non-discharging nozzles to discharge the printing material, to the printing apparatus in combination with the print image data.

According to the present invention, the foregoing object is attained by providing an information processing apparatus connected to and controlling a printing apparatus that prints an image by discharging a printing material from a plurality of nozzles, the apparatus comprising: acquisition means for acquiring information relating to arrangement of the nozzles of the printing apparatus; transmitting means for transmitting print image data, which corresponds to an image printed by the printing apparatus, to the printing apparatus; and determination means for determining, based upon the information relating to arrangement of the nozzles and the print image data, whether non-discharging nozzles that have failed to discharge the printing material over a predetermined period of time exist when an image is printed by the printing apparatus; wherein in a case where existence of the non-discharging nozzle has been determined by the determination means, the transmitting means transmits preliminary-discharge image data, which is for causing the non-discharging nozzles to discharge the printing material, to the printing apparatus in combination with the print image data.

According to the present invention, the foregoing object is attained by providing an image printing system comprising a printing apparatus for printing an image by discharging a printing material from a plurality of nozzles, and an information processing apparatus for controlling the printing apparatus, the printing apparatus including means for transmitting information relating to arrangement of the nozzles of the printing apparatus to the information processing apparatus; and the information processing apparatus including: receiving means for receiving the information relating to arrangement of the nozzles from the printing apparatus; transmitting means for transmitting print image data, which corresponds to an image printed by the printing apparatus, to the printing apparatus; and determination means for determining, based upon the information relating to arrangement of the nozzles and the print image data, whether non-discharging nozzles that have failed to discharge the printing material over a predetermined period of time exist when an image is printed by the printing apparatus; wherein in a case where existence of the non-discharging nozzle has been determined by the determination means, the transmitting means transmits preliminary-discharge image data, which is for causing the non-discharging nozzles to discharge the printing material, to the printing apparatus in combination with the print image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram illustrating the content of non-discharging nozzle information according to this embodiment; and FIG. 6 is a diagram illustrating the arrangement of transmit-image data according to this embodiment.

DESCRIPTION OF THE PREFERRED EMBODIMENT

A preferred embodiment of the present invention will now be described in detail with reference to the drawings. It should be noted that the relative arrangement of the components, the numerical expressions and numerical values set forth in this embodiment do not limit the scope of the present invention unless it is specifically stated otherwise.

(System Configuration)

Figure 1:
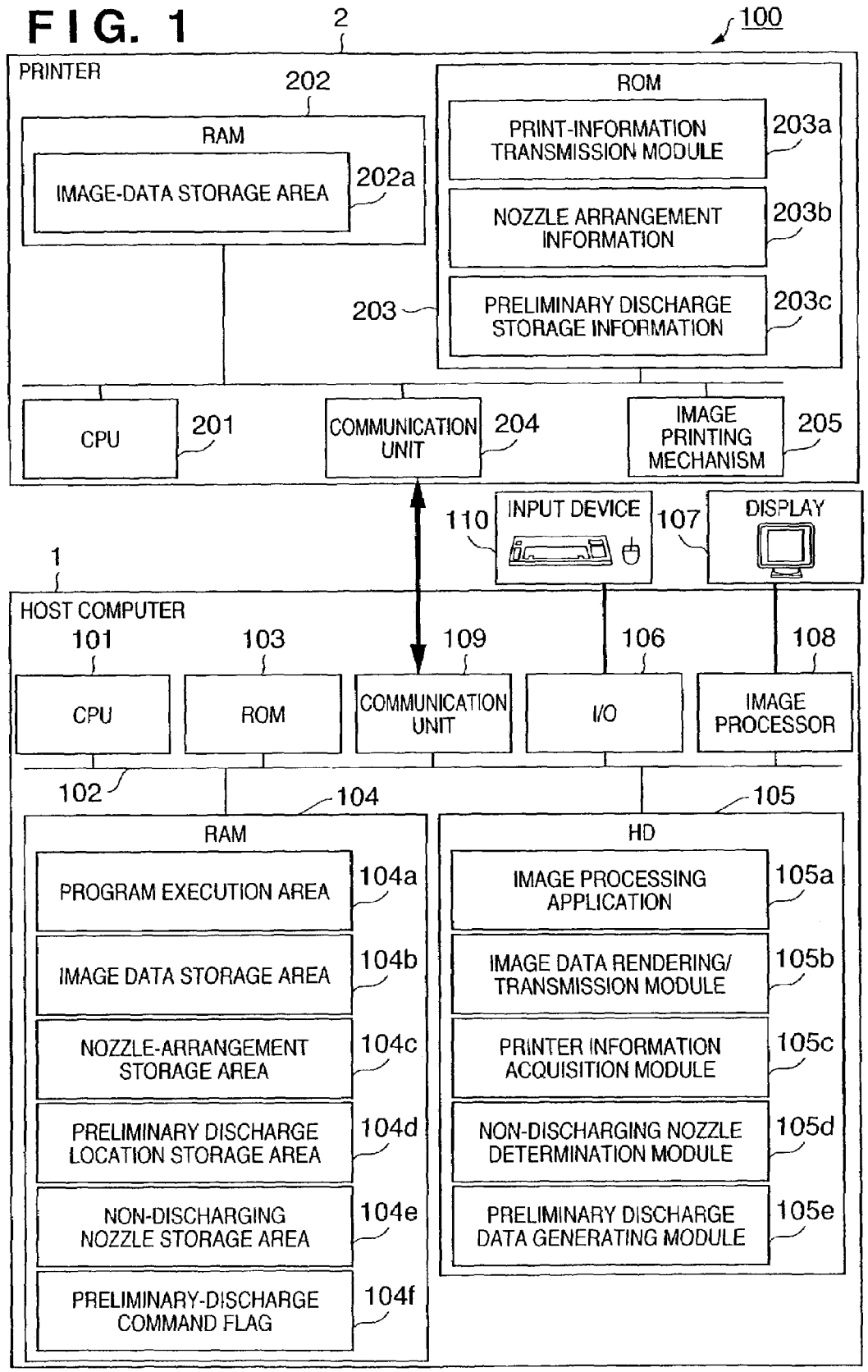
FIG. 1 is a block diagram illustrating the configuration of an image printing system embodying the present invention.

FIG. 1 is a block diagram illustrating an image printing system 100 according to an embodiment of the present invention. The image printing system 100 comprises a host computer 1, which serves as an information processing apparatus, and a printer 2, which serves as a printing apparatus, these being interconnected via a bidirectional interface.

The host computer 1 includes a CPU 101, a ROM (Read-Only Memory) 103, a RAM (Random-Access Memory) 104, an HD (Hard Disk) 105, an input/output (I/O) interface 106, an image processor 108 and a communication unit 109. These components are provided within the main unit of the host computer 1 and are interconnected by a bus 102. The host computer 1 is provided externally with an input device 110 and a display 107 connected to the input/output interface 106 and image processor 108, respectively.

The CPU 101 is a computation/control processor for controlling the overall host computer 1. The ROM 103 is a non-volatile memory for storing a booting program, which is executed by the CPU 101, and fixed values, etc. The RAM 104 is a volatile memory for storing data and programs temporarily. The hard disk 105 is a storage medium serving as storage means for storing an operating system and various program modules executed by the host computer 1. The input/output interface 106 is an interface for inputting/outputting data between the computer main unit and the input device 110.

The input device 110 is a device such as a keyboard or mouse for inputting commands and data. The display 107 is a device such as such as a liquid crystal display or CRT for outputting character or image data, which has been processed by the image processor 108, based upon a control command from the CPU 101. The image processor 108 is a unit that processes image data for display on the display 107. The communication unit 109 is a unit for sending and receiving data to and from the printer 2 via a wireless or wired communication channel.

More specifically, the RAM 104 includes a program execution area 104a for temporarily storing a program executed by the CPU 101; an image data storage area 104b for temporarily storing image data transmitted to the printer 2; a nozzle-arrangement storage area 104c for storing information relating to the nozzle arrangement of the printer 2; a preliminary discharge position storage area 104d for temporarily storing information relating to a preliminary discharge position of the printer 2; non-discharging nozzle storage area 104e for storing the number of non-discharge scans of a nozzle; and a flag storage area 104f for storing a preliminary-discharge command flag.

The hard disk 105 stores not only the operating system for controlling the host computer 1 itself but also a control program module for transmitting an image print command and image data to the printer 2 to cause the printer to execute preliminary discharge processing. More specifically, the hard disk 105 stores an image processing application 105a for generating image data in accordance with a command from the user. If the user has applied an image print command to the image processing application 105a, the image data of interest is rendered in the image data storage area 104b in one prescribed area at a time, and an image data rendering/transmission module 105b for image data transmitted to the printer 2 is stored on the hard disk 105. Furthermore, a printer information acquisition module 105c for acquiring nozzle arrangement information and preliminary discharge position information from the printer 2 is stored on the hard disk 105 as information relating to the specifications of the printer 2. The hard disk 105 further stores non-discharging nozzle determination module 105d for detecting a nozzle that has not discharged ink, which serves as a printing material, over a predetermined period of time, and a preliminary discharge data generating module 105e that generates preliminary discharge data for forcibly causing non-discharging nozzles to discharge ink.

The printer 2 includes a CPU 201, a RAM (Random-Access Memory) 202, a ROM (Read-Only Memory) 203, a communication unit 204 and an image printing mechanism 205. The CPU 201 is a computation/control processor for controlling the overall printer 2. The RAM 202 is a volatile memory for storing received data temporarily. The ROM 203 is a non-volatile memory for storing a program, which is executed by the CPU 201, and data, etc. The communication unit 204 is a unit for sending and receiving data to and from the host computer 1 via a wireless or wired communication channel.

The image printing mechanism 205 is a so-called ink-jet printing mechanism for printing an image by discharging ink from a plurality of nozzles provided on a printhead.

(Structure of Printing Mechanism)

Figure 2:
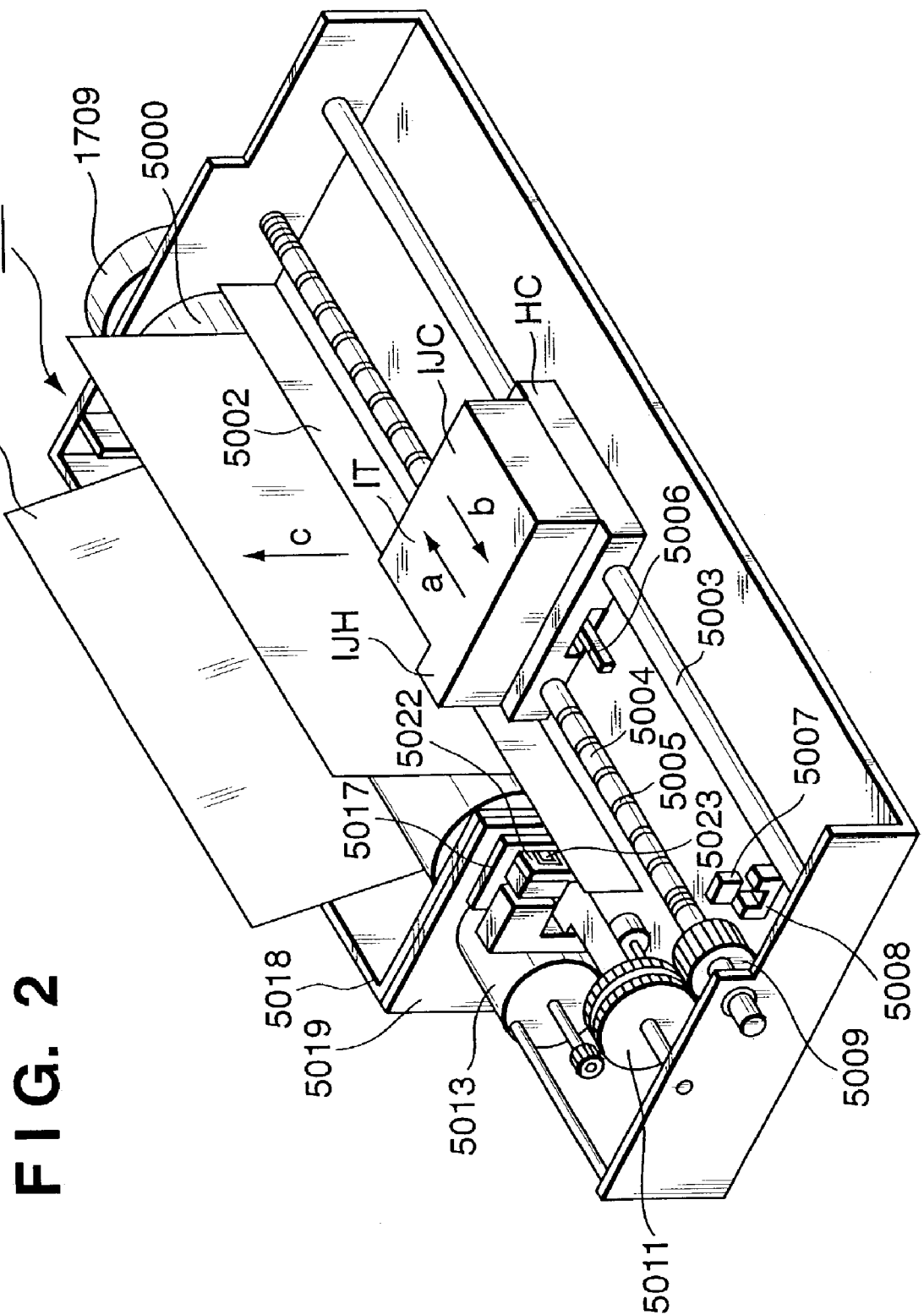
FIG. 2 is a schematic perspective view illustrating the image printing mechanism of a printer according to an embodiment of the present invention.

FIG. 2 is a perspective view illustrating the general appearance of the image printing mechanism 205, which is equipped with an ink-jet printhead IJH having a plurality of nozzles.

When a driving motor 5013 is driven into rotation, the rotation thereof is transferred to a lead screw 5004 via driving force transmission gears 5009 to 5011. As a result, a carriage HC engaged with a helical groove 5005 of the lead screw 5004 is moved back and forth in directions of arrows a and b. Numeral 5002 denotes a paper retaining plate which presses a printing sheet P serving as a printing medium against a platen 5000 along the traveling direction of the carriage HC. The platen roller 5000 is driven rotatively by a transport motor 1709. Numerals 5007, 5008 denote photocouplers which constitute home position sensing means for verifying the presence of a carriage lever 5006 in the vicinity of the photocouplers and changing over the direction in which the motor 5013 is rotated. Numeral 5017 denotes a cleaning blade, and numeral 5019 denotes a member which makes it possible to move the cleaning blade back and forth. The cleaning blade and the member are supported on a support plate 5018.

A cap member 5022 caps the front side of the ink-jet printhead IJH. Recovery of the nozzles of the printhead IJH is performed by causing a cap opening 5023, which is provided within the cap member 5022, to perform a forcible discharge of ink. Specifically, the position at which the cap member 5022 is situated is a preliminary discharge position. This preliminary discharge position has been stored in the ROM 203 as preliminary discharge position information 203c. The image printing mechanism 205 is equipped with one more cap member, not shown. Position information relating to this cap member also has been stored in the ROM 203. The two cap members are so situated as to bracket the printing zone.

The image printing mechanism 205 is such that the printhead is caused to scan the printing sheet P in the sub-scan direction (the direction of arrow a or b) while the printing sheet P is transported in the main-scan direction (the direction of arrow c). A desired image is printed on the printing sheet P by discharging ink from the nozzles in sync with the scanning operation. In order to effect the recovery of a nozzle that has not discharged ink properly, the printhead IJH is moved to the preliminary discharge position (the position of the cap member 5022) at a prescribed timing and ink is forcibly discharged from the nozzle.

Figure 3:
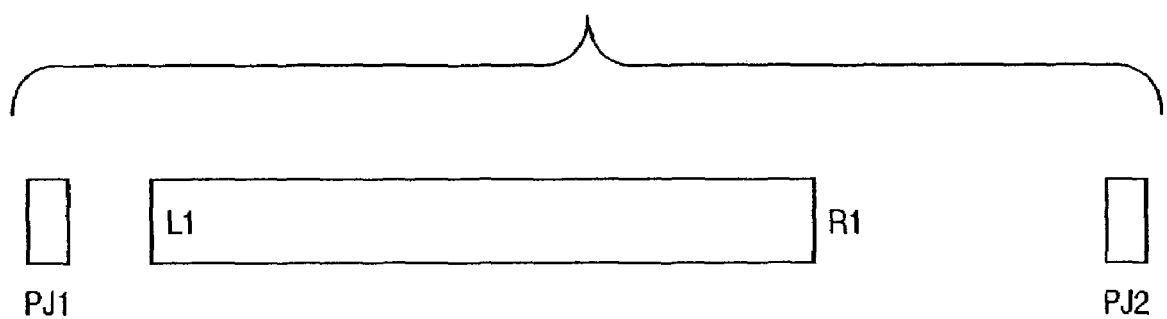
FIG. 3 is a diagram illustrating the relationship between the printing zone and preliminary discharge positions in the printer according to this embodiment.

FIG. 3 is a diagram illustrating the relationship between the printing zone of the printer 2 and preliminary discharge positions at which ink can be discharged for purposes other than printing. The area from a left-end position L1 to a right-end position R1 is the printing zone. A preliminary discharge position PJ1 is set nearer the left-end position L1, and a preliminary discharge position PJ2 is set nearer the right-end position R1.

(Processing for Specifying Preliminary Discharge Timing)

Figure 4:
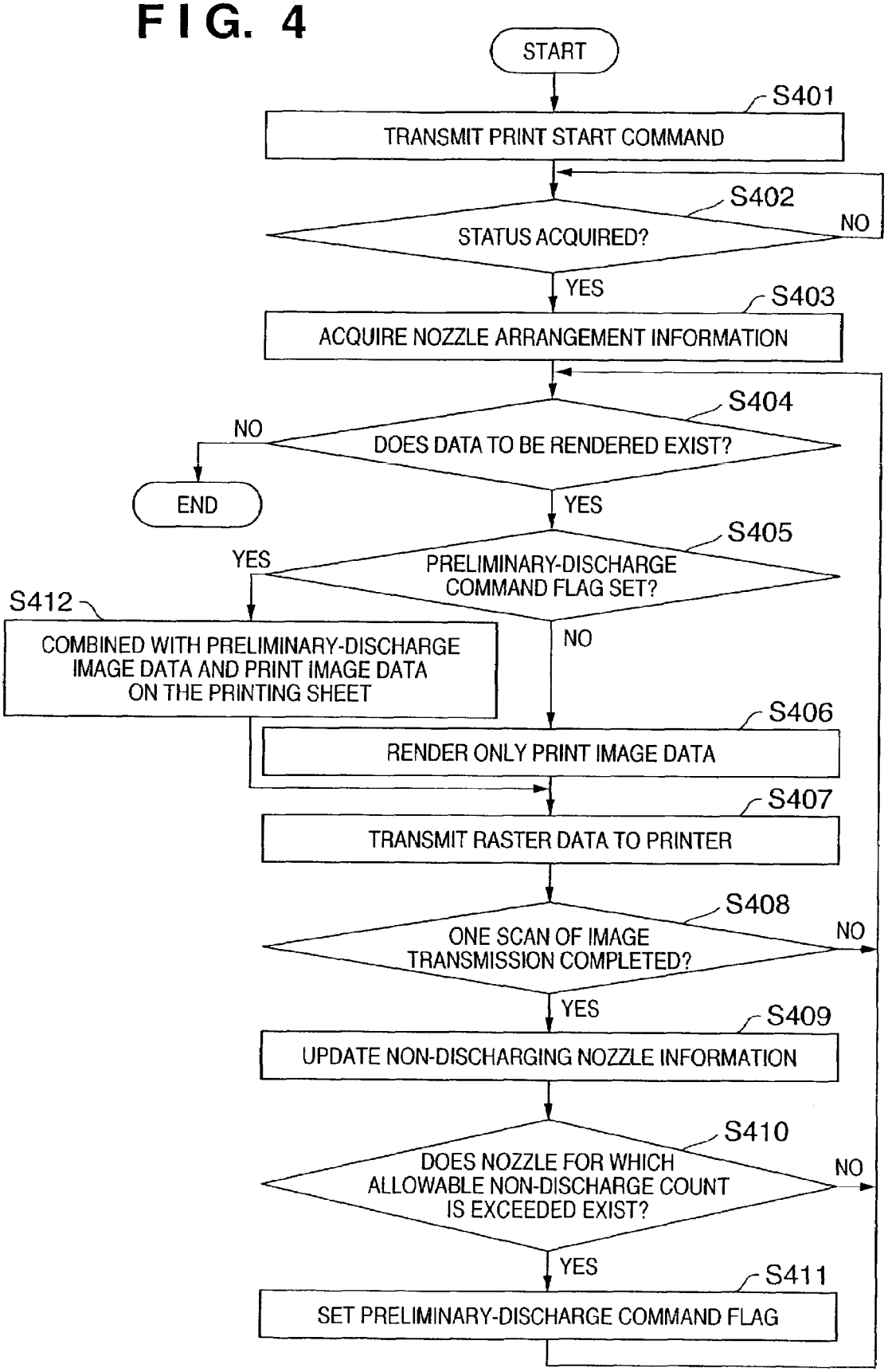
FIG. 4 is a flowchart illustrating the flow of processing executed by a host computer according to this embodiment.

FIG. 4 is a flowchart illustrating the flow of processing of a control program run by the host computer 1. When an image print command from the image processing application 105a is detected, the host computer 1 transmits a print start command to the printer 2 via the interface at step S401.

If the host computer 1 has transmitted the print start command, it waits for receipt of status information from the printer 2 at step S402. If the status information is received, control proceeds to step S403, at which the host computer 1 uses the printer information acquisition module 105c to acquire nozzle arrangement information and preliminary discharge position information from the status information. On the basis of the nozzle arrangement information, the host computer 1 calculates and stores the number of rasters of image data needed by the printer 2 to scan the printhead IJH once.

Next, at steps S404 to S408, the image data rendering/transmission module 105b is run to render and transmit image data one raster as a time. First, at step S404, the module 105b determines whether data to be rendered exists. If such data does not exist, then the module 105b terminates processing upon deciding that printing of the specified image has ended. Next, at step S405, the module 105b determines whether the preliminary-discharge command flag 104f has been set with regard to nozzles corresponding to one raster of image data to be rendered. The initial value of the flag 104f is that of the reset state.

If the preliminary-discharge command flag 104f has not been set, control proceeds to step S406, where only image data for printing is rendered for the purpose of printing the image on the printing sheet. This is followed by step S407, at which the module 105b transmits one raster of image data to the printer 2. Whenever one raster of image data is transmitted at step S407, the module 105b increments the number of transmitted rasters stored internally. If the number of rasters of one scan obtained from the nozzle arrangement information as mentioned above is attained, the module 105b decides that data transfer of one scan has ended and control proceeds from step S408 to step S409. If data transfer of one scan has not ended, control returns from step S408 to step S404 and processing for rendering and transmitting one raster of image data is executed again.

Next, at steps S409 to S412, the host computer 1 runs the non-discharging nozzle determination module 105d to detect a nozzle that has not discharged ink for a predetermined period of time. First, at step S409, the module 105d updates the non-discharging nozzle information that has been stored in the non-discharging nozzle storage area 104e of RAM 104. FIG. 5 is a diagram illustrating the content of the non-discharging nozzle information 501. The non-discharging nozzle information 501 shown in FIG. 5 is information that includes the number of non-discharge scans of each nozzle. Using the image data rendered by the processing of steps S404 to S408 and the acquired nozzle arrangement information, the non-discharging nozzle determination module 105d specifies nozzles for which absolutely no image data was developed during the scan, namely non-discharging nozzles that discharged absolutely no ink during the scan. The module increments the non-discharge scan count that corresponds to the nozzle number of the particular non-discharging nozzle and resets the non-discharge scan counts that correspond to the nozzle numbers of nozzles other than the non-discharging nozzles.

Next, at step S410, the non-discharging nozzle determination module 105d determines whether the non-discharging nozzle information 501 contains a nozzle for which the non-discharge scan count is greater than a predetermined allowable non-discharge count. The allowable non-discharge count may be derived from the acquired nozzle arrangement information or may be acquired directly from the printer 2. Furthermore, in a case where the scanning speed of the ink-jet printhead IJH of printer 2 is contained in the status information acquired at step S402, the allowable non-discharge count may be derived from this scanning speed. For example, if the scanning speed is high, the allowable non-discharge count would be set to be larger than the count when the scanning speed is low. If the allowable non-discharge count is thus set taking the scanning speed into consideration, the period of time over which a nozzle fails to discharge can be obtained more accurately and the preliminary discharge operation can be performed at a more suitable nozzle recovery timing.

If it is found at step S410 that a nozzle for which the non-discharge scan count has exceeded the allowable non-discharge count exists, then the preliminary-discharge command flag 104f corresponding to this nozzle is set and control returns to step S404. If it is found at step S410 that a nozzle for which the non-discharge scan count has exceeded the allowable non-discharge count does not exist, then control returns to step S404 without the flag being set.

If the preliminary-discharge command flag is set at step S411, control returns to step S404, after which control proceeds from step S405 to step S412. When image data is rendered, the preliminary discharge data generating module 105e is executed to thereby generate one raster of image data by combining the preliminary-discharge image data with the print image data. This is illustrated in FIG. 6. In a case where the preliminary discharge position is spaced away from the printing zone, NULL data for which ink is not discharged is added as dummy data between the print image data and the preliminary-discharge image data, whereby raster data is generated as overall data. When this rendering processing ends, the preliminary-discharge command flag is reset. In a case where the printer 2 has a plurality of preliminary discharge positions, the preliminary-discharge image data is embedded at the position corresponding to the preliminary discharge position on the side closest to the printing zone.

By virtue of the structure and processing described above, the printer 2 judges that there is image data up to the preliminary discharge position, executes image print processing in the usual manner and implements head recovery processing. That is, the timing of preliminary discharge by the printer 2 is detected by the host computer 1 and the preliminary-discharge image data is transferred to the printer 2 as part of the image data, whereby printhead recovery processing can be executed efficiently without adding on a new preliminary discharge command or the like. As a result, in accordance with this embodiment, preliminary discharge processing in a printing apparatus can be carried out in an efficient manner.

(Other Embodiments)

The present invention may be applied to a system constituted by a plurality of devices or to an apparatus comprising a single device.

Furthermore, there are cases where the object of the invention is attained also by supplying a software program, which implements the functions of the foregoing embodiment, directly or remotely to a system or apparatus, reading the supplied program codes with a computer of the system or apparatus, and then executing the program codes. In this case, so long as the system or apparatus has the functions of the program, the mode of implementation need not rely upon a program.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or print data supplied to an operating system, etc., does not matter.

Examples of storage media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or an automatically installable compressed file of this program can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiment can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A program stored in a computer readable medium for causing a computer, which is connected to and controls a printing apparatus that prints an image by discharging a printing material from a plurality of nozzles, to execute the following steps:

an acquisition step of acquiring information relating to arrangement of the nozzles of the printing apparatus;

a transmitting step of transmitting print image data, which corresponds to an image printed by the printing apparatus, to the printing apparatus; and a determination step of determining, based upon the information relating to arrangement of the nozzles and the print image data, whether non-discharging nozzles that have failed to discharge the printing material over a predetermined period of time exist when an image is printed by the printing apparatus, wherein in a case where existence of the non-discharging nozzles has been determined at said determination step, said transmitting step transmits preliminary-discharge image data, which is for causing the non-discharging nozzles to discharge the printing material, to the printing apparatus in combination with the print image data.

2. The program according to claim 1, wherein said acquisition step further acquires a preliminary discharge position on the printing apparatus; and said transmitting step transmits the preliminary-discharge image data in combination with the print image data in such a manner that the printing material will be discharged from a nozzle at the preliminary discharge position.

3. The program according to claim 2, wherein in a case where the preliminary discharge position of the printing apparatus is spaced away from a printing zone in which printing of an image is performed, said transmitting step inserts null data between the preliminary-discharge print data and print image data and transmits the resultant data to the printing apparatus as one line of raster data.

4. The program according to claim 2, wherein in a case where there are a plurality of preliminary discharge positions acquired at said acquisition step, said transmitting step combines the preliminary-discharge image data with the print image data in such a manner that the printing material will be discharged from a nozzle at a preliminary discharge position that is closest to the image to be printed.

5. The program according to claim 1, wherein the printing apparatus has a printhead equipped with a plurality of nozzles; and said determination step performs the determination whenever print image data equivalent to one scan of the printhead is transmitted at said transmitting step.

6. The program according to claim 4, wherein said determination step determines that a nozzle that has not discharged the printing material even once over a predetermined number of scans of the printhead is a non-discharging nozzle.

7. The program according to claim 5, wherein said acquisition step further acquires scanning speed of the printhead; and said determination step changes the predetermined number of scans in accordance with the scanning speed of the printhead.

8. A control method for controlling a printing apparatus that prints an image by discharging a printing material from a plurality of nozzles, said method comprising:

an acquisition step of acquiring information relating to arrangement of the nozzles of the printing apparatus;

a transmitting step of transmitting print image data, which corresponds to an image printed by the printing apparatus, to the printing apparatus; and a determination step of determining, based upon the information relating to arrangement of the nozzles and the print image data, whether non-discharging nozzles that have failed to discharge the printing material over a predetermined period of time exist when an image is printed by the printing apparatus, wherein in a case where existence of the non-discharging nozzles has been determined at said determination step, said transmitting step transmits preliminary-discharge image data, which is for causing the non-discharging nozzles to discharge the printing material, to the printing apparatus in combination with the print image data.

9. An information processing apparatus connected to and controlling a printing apparatus that prints an image by discharging a printing material from a plurality of nozzles, said apparatus comprising:

acquisition means for acquiring information relating to arrangement of the nozzles of the printing apparatus;

transmitting means for transmitting print image data, which corresponds to an image printed by the printing apparatus, to the printing apparatus; and determination means for determining, based upon the information relating to arrangement of the nozzles and the print image data, whether non-discharging nozzles that have failed to discharge the printing material over a predetermined period of time exist when an image is printed by the printing apparatus, wherein in a case where existence of the non-discharging nozzles has been determined by said determination means, said transmitting means transmits preliminary-discharge image data, which is for causing the non-discharging nozzles to discharge the printing material, to the printing apparatus in combination with the print image data.

10. An image printing system comprising a printing apparatus for printing an image by discharging a printing material from a plurality of nozzles, and an information processing apparatus for controlling said printing apparatus;

said printing apparatus including means for transmitting information relating to arrangement of the nozzles of the printing apparatus to said information processing apparatus; and said information processing apparatus including:

receiving means for receiving the information relating to arrangement of the nozzles from said printing apparatus;

transmitting means for transmitting print image data, which corresponds to an image printed by said printing apparatus, to said printing apparatus; and determination means for determining, based upon the information relating to arrangement of the nozzles and the print image data, whether non-discharging nozzles that have failed to discharge the printing material over a predetermined period of time exist when an image is printed by said printing apparatus, wherein in a case where existence of the non-discharging nozzles has been determined by said determination means, said transmitting means transmits preliminary-discharge image data, which is for causing the non-discharging nozzle to discharge the printing material, to said printing apparatus in combination with the print image data.

11. A printing apparatus for printing an image by discharging a printing material from a plurality of nozzles, said apparatus comprising:

receiving means for receiving print image data; and printing means for printing an image based upon the printing image data received by said receiving means, wherein if non-discharging nozzles that have failed to discharge the printing material over a predetermined period of time exist, said receiving means receives image data including the printing image data and preliminary-discharge image data, and said printing means discharges the printing material from the non-discharging nozzles based upon the preliminary-discharge image data to perform a preliminary discharge operation.

12. The printing apparatus according to claim 11, further comprising means for transmitting information relating to arrangement of the nozzles, wherein the non-discharging nozzles are specified based upon the information and the print image data.

13. A control method for controlling a printing apparatus that prints an image by discharging a printing material from a plurality of nozzles, said method comprising:

a determination step of determining whether non-discharging nozzles that have failed to discharge the printing material over a predetermined period of time exist or not, using the print image data prior to transmission to the printing apparatus; and an instruction step of instructing the printing apparatus to perform preliminary-discharging if it is determined in said determination step that the non-discharging nozzles exist.

* * * * *